Oct. 23, 1962  E. C. PFEFFER, JR  3,059,923
ORIENTATING DEVICE
Filed March 14, 1960

INVENTOR
EDWARD C. PFEFFER JR.

BY

ATTORNEY

United States Patent Office 3,059,923
Patented Oct. 23, 1962

3,059,923
ORIENTATING DEVICE
Edward C. Pfeffer, Jr., Troy, N.Y., assignor to Cluett, Peabody & Co., Inc., Troy, N.Y., a corporation of New York
Filed Mar. 14, 1960, Ser. No. 14,854
1 Claim. (Cl. 271—58)

This invention relates to a device for accurately orienting a cloth ply or an assembly of cloth plies and for accurately depositing the oriented ply or assembly on a receiving surface.

In any automatic handling of cloth, contemplating the performance of a processing function on the cloth by automatic processing machinery, it is necessary to accurately orient or to accurately orient and deposit the cloth ply in relation to the processing machinery in order to produce uniform products. The present device provides a simple, inexpensive, and reliable method of orienting and of accurately depositing a single ply of cloth or a cloth assembly on a receiving surface such as a portion of a processing machine.

According to the present invention, a cloth ply which is to be oriented and accurately deposited, is placed on a horizontally movable shutter. If the ply is to be deposited in addition to being oriented, the shutter is positioned slightly above a receiving surface on which the cloth is to be deposited. In either case, gauging means comprising a nest of scrapers bear on the top of the shutter and are positioned to define limits of horizontal movement of the cloth ply. Motor means move the shutter horizontally at an angle to the scraper nest and thereby move the edges of the cloth ply resting on the shutter against the nest of scrapers into registering relationship to accurately orient the cloth ply. Continued movement of the shutter causes the cloth ply to be eased off the free end of the shutter and deposited on the receiving surface below. The cloth ply falls from the shutter surface to the receiving surface in a smooth catenary curve which does not disturb its accurate orientation.

It is therefore an object of the present invention to provide a device which will orient a single cloth ply or assembly of plies.

Another object of the present invention is to provide a device which will orient and accurately deposit a single cloth ply or an assembly of plies on a receiving surface.

Other objects and advantages of the present invention will be obvious from the following description and drawings in which.

Figure 1:
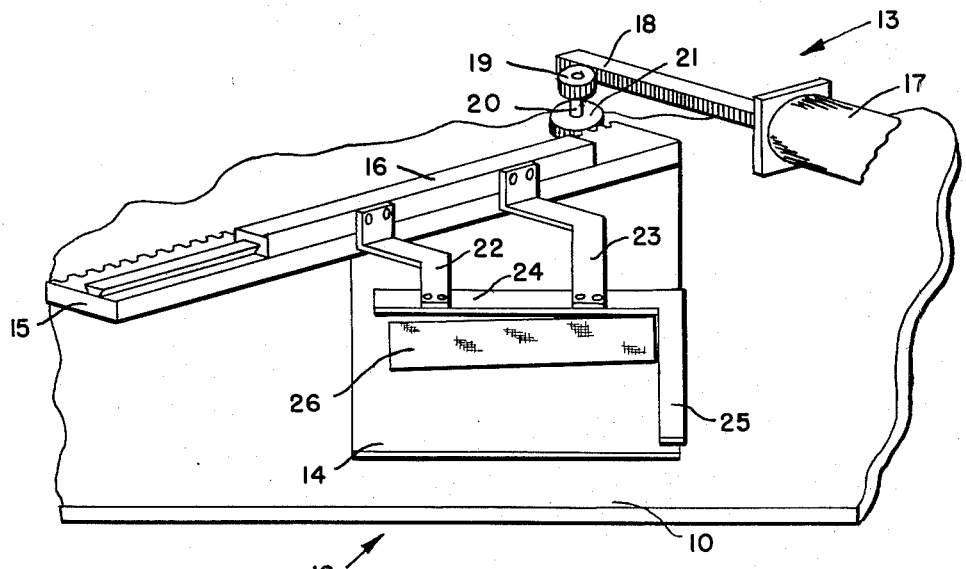
FIG. 1 is an isometric view of the orienting device constructed according to the present invention.

Referring to FIG. 1 of the drawing, the orienting and deposit device 13 of the present invention is illustrated above a cloth receiving surface 10. The receiving surface 10 may have any desired shape and may be movable to transport the oriented cloth ply to a desired work area or it may be a machine for performing the work on the cloth ply.

The orienting device 13 is suitably mounted above the deposit surface in any well known manner as by a frame work. The orienting device 13 has a shutter blade 14 preferably made of a thin material having a smooth surface, such as chrome plated steel or Teflon coated steel. Shutter blade 14 is fixedly attached to a drive rack 15 slightly above the receiving surface 10. The drive rack 15 is supported in sliding engagement with a guide and support bar 16 which in turn is rigidly attached to a surpporting frame (not shown) in any well known manner. The guide and supporting bar 16 provides horizontal motion of the drive rack 15 and the shutter 14.

A pneumatic air motor 17, rigidly attached to a suitable supporting frame, is controlled by high pressure air from a supply (not shown). A gear rack 18 is attached to the piston arm of the air motor 17 and is carried in a forward and backward direction by the operation of the air motor 17. The gear rack 18 engages a pinion gear 19 which is mounted on one end of a spindle 20. The spindle 20 is suitably journaled to the frame (not shown). A second pinion gear 21 is mounted on the lower end of the spindle 20 and this gear 21 engages the drive rack 15 to control its movement along the support bar 16. The air motor 17 may be provided with suitable speed regulating means for adjusting the speed at which the gear rack 18 drives the gears 19 and 21 and the drive rack 15.

Supported by the guide and supporting bar 16 on two laterally extending brackets 22 and 23 are two nest scrapers 24 and 25. The nest scrapers 24 and 25 are stationary and are in sliding engagement with the moveable shutter 14 to limit the horizontal travel of any cloth ply positioned on the shutter 14. The scrapers 24 and 25 are shown positioned to engage the edges of a rectangularly shaped cloth ply 26 thereby limiting motion of the cloth ply on shutter 14 along two perpendicular lines, however, it will be apparent that any other motion limiting arrangement may be used as required depending upon the shape of the cloth ply to be oriented.

Figure 2:
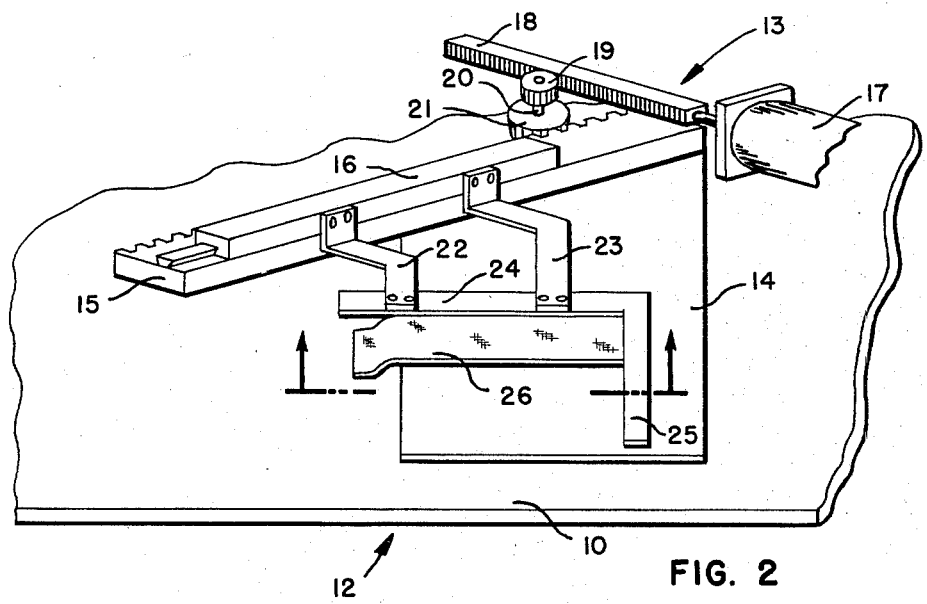
FIG. 2 is an isometric view of the device shown in FIG. 1 illustrating the deposit of an oriented cloth ply.

The bracket 23 is somewhat longer than the bracket 22 so that the direction of the motion of the shutter 14 guided by the sliding action of the drive rack 15, which will be parallel to supporting bar 16, is at an angle of about 15 degrees with the forward surface of the nest scraper 24. Thus, the cloth ply 26 on the shutter 14 will be carried against both scrapers and be oriented thereby as is shown in FIG. 2. The nest scrapers 24 and 25 may be spring loaded to positively bear down upon the shutter blade 14 and prevent any possibility of the cloth ply 26 passing between the scrapers 24, 25 and shutter blade 14.

In the illustrated embodiment, a single cloth ply 26 is positioned on the shutter blade 14 by any automatic feed device capable of transporting a single cloth ply and positioning the cloth ply adjacent to the scraper 24 with reasonable accuracy, but not with the accuracy of the present orienting device 13. After a single cloth ply 26 has been deposited on the shutter blade 14 and upon response to a control signal, a forward action of the gear rack 18 of air motor 17 moves the shutter blade 14 with a controlled speed in a direction toward the scrapers 24 and 25 and at an angle of approximately 15 degrees with scraper 24.

This action brings the long edge of the cloth ply 26 (assuming a rectangular cloth ply such as is used for cuff construction was placed on the shutter blade 14) against the scraper 24 first to orient the cloth axially and then the short edge of the cloth ply 26 is carried forward against the scraper 25. As the horizontal motion of the shutter blade 14 continues, the shutter blade 14 travels beyond the scraper 25 so that the scraper 25 wipes the cloth ply off the end of the shutter blade 14 thereby accurately depositing the cloth ply 26.

Figure 3:
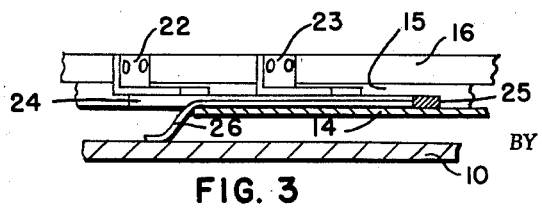
FIG. 3 is a sectional view taken on line 3—3 of FIG. 2.

As shown in FIG. 3, the end of the cloth ply 26 falls in a characteristic catenary curve on the receiving surface 10. The location of the cloth ply 26 on the receiving surface 10 is accurately determined by the location of the scraper blades 24 and 25 which are mounted to the fixed support 16 of the shutter unit assembly so as to be minutely adjustable.

The speed of the shutter blade 14 is adjustable and is subject to accurate control by adjustment of the motion of air motor 17. As the cloth ply 26 falls over the end of the retreating shutter blade 14 and comes to rest on the receiving surface 10, the angle of its catenary curve is a function of the height of the drop, the flexibility of the cloth and the speed of the shutter blade 14, thus the speed of the shutter blade 14 must not be great enough to collapse the cloth ply 26 against the shutter scraper 25, but it must be sufficiently fast and uniform to provide a smooth catenary and not to permit the first end of the cloth ply to flip forward. It is also desirable to maintain the height of the drop to a minimum so as to maintain as short a catenary as possible.

Although not shown, other orienting device stations would be located successively along a line or radius for accurately orienting and depositing other cloth plies on the receiving surface. In this manner an assembly of any number of cloth plies desired can be superposed in an accurately aligned stack and forwarded to further processing stations.

It will be understood that various changes in the details of the invention which has been described and illustrated above may be made by those skilled in the art within the principle and scope of the invention as expressed in the appended claim.

I claim:

In a device for accurately orienting and depositing a substantially rectangular cloth ply onto a horizontal receiving surface, a horizontally movable shutter positioned slightly above said receiving surface and supporting said cloth ply, motor means for moving said shutter horizontally for a prescribed distance of travel, and a pair of stationary scrapers disposed at substantially right angles to each other and in sliding engagement with the surface of said shutter and mounted relative to said shutter such that one of said scrapers extends at an acute angle across the direction of travel of said shutter, said pair of scrapers being positioned at a point relative to the entire length of travel of the shutter so that during the initial travel of the shutter a side and a front edge of said cloth ply are aligned against the scrapers and during the remaining travel of the shutter said aligned cloth ply is then eased off the shutter onto the receiving surface.

References Cited in the file of this patent

UNITED STATES PATENTS

| | | |
|---|---|---|
| 1,489,045 | Stevens | Apr. 1, 1924 |
| 2,387,750 | Davidson | Oct. 30, 1945 |
| 2,414,059 | Powers | Jan. 7, 1947 |
| 2,593,343 | Rayburn et al. | Apr. 15, 1952 |
| 2,701,650 | Stevenson | Feb. 8, 1955 |

FOREIGN PATENTS

| | | |
|---|---|---|
| 4,222 | Great Britain | Feb. 18, 1914 |